United States Patent [19]

Scarzello et al.

[11] 3,824,573

[45] July 16, 1974

[54] MAGNETIC BUBBLE RESONANCE SENSOR

[76] Inventors: John F. Scarzello, 6917 Allview Dr., Ellicott City, Md. 21046; Robert S. Sery, 1105 Oakview Dr., Silver Spring, Md. 20903

[22] Filed: July 19, 1973

[21] Appl. No.: 380,642

[52] U.S. Cl. ...................... 340/174 RF, 340/174 TF

[51] Int. Cl. ........................ G11c 11/14, G11c 19/00

[58] Field of Search ................. 340/174 TF, 174 RF

[56] References Cited

UNITED STATES PATENTS

| | | | |
|---|---|---|---|
| 3,448,438 | 6/1969 | Hansen et al. | 340/174 RF |
| 3,460,116 | 8/1969 | Bobeck et al. | 340/174 TF |
| 3,559,191 | 1/1971 | Ehresman | 340/174 RF |
| 3,716,781 | 2/1973 | Almasi et al. | 340/174 TF |
| 3,729,724 | 4/1973 | Ahearn et al. | 340/174 TF |

*Primary Examiner*—Stanley M. Urynowicz, Jr.
*Attorney, Agent, or Firm*—R. S. Sciascia; J. A. Cooke; Sol Sheinbein

[57] ABSTRACT

A magnetic sensor to sense the presence or absence of a bubble domain at selected locations in a magnetic bubble memory or logic element, employing magnetic resonance phenomena to sense the bubble domain.

7 Claims, 3 Drawing Figures

PATENTED JUL 16 1974 3,824,573

SHEET 2 OF 2

MAGNETIC BUBBLE RESONANCE SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to magnetic devices and more particularly to a magnetic bubble sensor.

Magnetic thin films of certain materials such as garnet, orthoferrite, etc., possessing uniaxial anisotropy perpendicular to the plane of the film are divided into alternate regions of opposite magnetization called stripe domains. Either set of domains can be contracted, using the proper value of d.c. magnetic field biasing, into smaller circular regions. These regions are cylindrical, extending through the magnetic thin film but, as rendered visible by means of the Faraday effect, appear circular and are thus called bubble domains. These bubble domains are 1 to 25 microns in diameter and are used in a bubble domain assembly comprising the film, a substrate on which the film has been deposited, a biasing field, which may be supplied by small permanent magnets surrounding the film, and a means for moving the bubbles, such as a rotating magnetic field in the plane of the film as produced by two pair of orthogonal Helmholtz coils with a.c. fields 90° out of phase. In addition, certain sensors are utilized to sense the presence of bubbles at given locations. Bubble domain devices are used to perform both memory and logic functions within the same device, in contrast to other devices wherein memory and logic functions are performed separately.

Bubble domains can be moved easily and swiftly by applying a small rotating magnetic filed parallel to the plane of the thin film. In a logic or memory function, sensing these bubbles as they move past selected readout locations in a necessary requirement, presently accomplished by sensing magnetic field changes by various means. Among them is to sense the domain inductively by a conductor loop as shown in U.S. Pat. No. 3,508,222. The time change of magnetic flux associated with the domain causes an output signal in a conductor loop. Another sensing scheme employs the Kerr or Faraday effect of optical polarization techniques wherein the presence or absence of domains will differently affect the passage of polarized light through the magnetic sheet. An example of this scheme is shown in U.S. Pat. No. 3,515,456. Another scheme employs magnetoresistance changes wherein magnetoresistive elements undergo a resistance change in the presence of cylindrical domains. U.S. Pat. No. 3,691,540 describes one such sensing device. Another sensing device employs the Hall effect by placing a semiconductor element adjacent to the path followed by the domain and the Hall voltage developed as a result of the stray magnetic field of the domain is sensed. These methods do not perform satisfactorily for a number of reasons, namely low signal to noise ratios, expensive add-on sense amplifiers, temperature problems, and expensive and bulky add-on equipment.

SUMMARY OF THE INVENTION

A magnetic thin film, such as orthoferrite or garnet contains bubble domains moving in the film. In order to detect the presence or absence of bubble domains at certain locations in the film an alternating field perpendicular to the homogenous bias field is applied parallel to the film and a tuned coil placed above the film detects a change in its Q when a bubble passes beneath it due to resonance power absorption by the bubble material. In an alternative embodiment, the coil forms part of a marginal oscillator and develops the alternating field. In a third embodiment, the pick up coils are driven by a constant source of alternating current.

OBJECTS OF THE INVENTION

It is therefore an object of the present invention to provide a sensor to detect the presence of a bubble domain at selected locations in a magnetic bubble memory.

Another object of the present invention is to provide a system of detecting a bubble domain using magnetic resonance phenomena.

Yet another object of the present invention is to provide an improved signal to noise ratio bubble detector.

Still another object of the present invention is to provide an inexpensive and compact magnetic bubble sensor.

A still further object of the present invention is to provide a measurement of the magnetic resonance for bubble detection.

Other objects, advantages and novel feature of the invention will become apparent from the following detailed description of the invention when considered in conjunction with the accompanying drawings wherein:

FIGS. 1, 2 and 3 illustrate schematic views of alternative bubble domain memory and sensor.

DESCRIPTION OF THE PREFERRED EMBODIMENT

Figure 1:
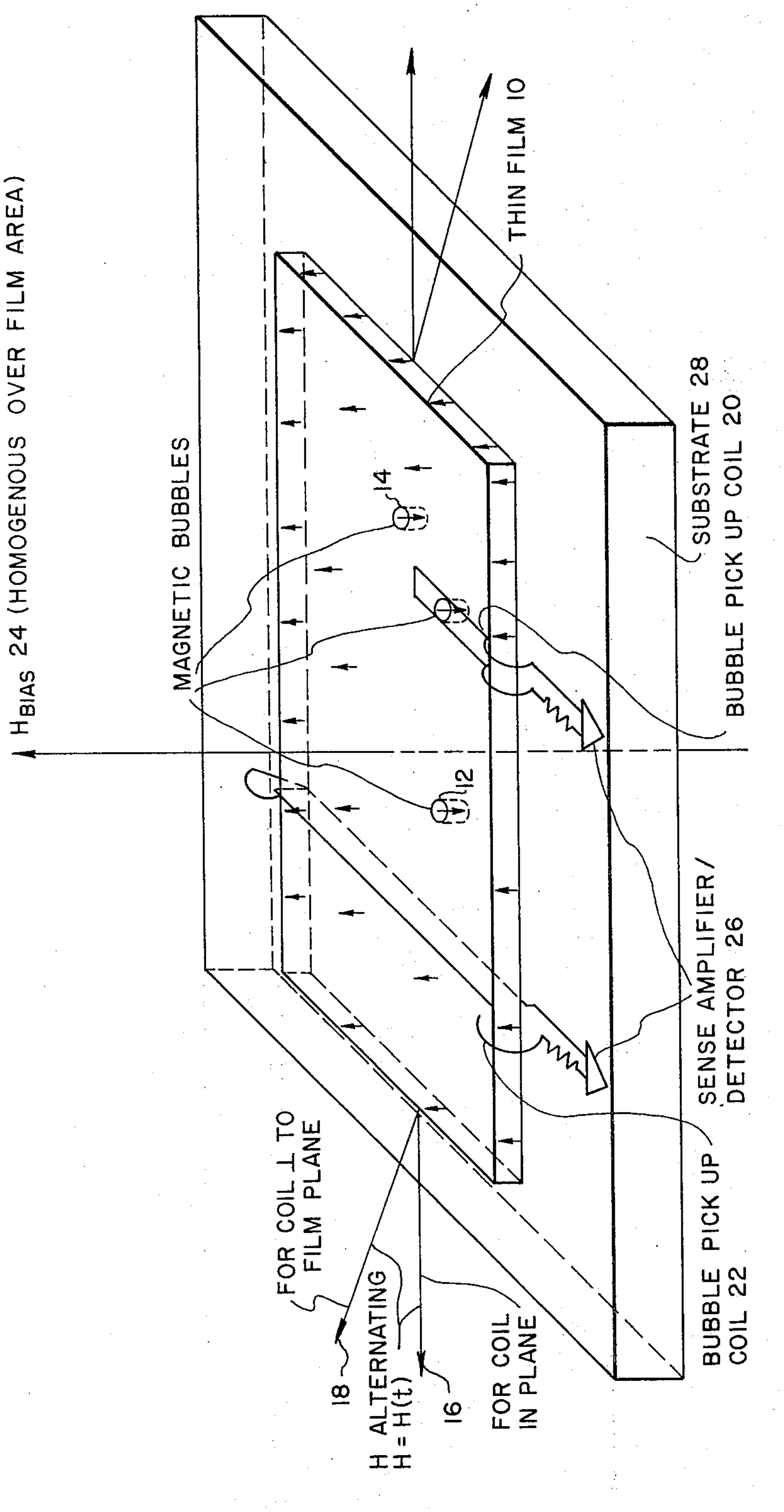

Bubble domain materials such as garnets and orthoferrites are divided into regions that are magnetized into oppossing sets of dark and light stripe domains. Either one of these sets of domains can be contracted into small bubbles which are small cylindrical domains approximately 1 to 25 microns in diameter which are used to perform logic and memory functions.

The thin film logic or memory element is a sample containing magnetic moments, $\vec{\mu}$, of both electrons and nuclei of the chemical elements in the film. These moments tend to align themselves with the bias magnetic field, $H_{bias}$, required to produce the bubble domains, but are prevented from obtaining perfect alignment due to thermal energy from a finite temperature. Therefore, these magnetic moments precess about the homogenous bias field at a frequency, ω, which is a function of the bias field intensity, H, and local internal field interaction, with γ (the gyromagnetic ratio), according to the formula $$\omega = \gamma H \quad (1)$$

Magnetic bubble domains are formed in single crystal materials by the balancing of several forces that minimize the sum of the magnetic energy, the exchange energy and the magnets crystalline energy. These energies line up in a preferred direction perpendicular to the plane of the film by the application of an external bias field along the crystal's easy axis of magnetization. When an external magnetizing field is applied to the easy axis, demagnetizing forces are set up to reduce the overall magnetization and in the process produce bubble domains or regions opposing the magnetizing field and the majority of the magnetized domains.

Bubble domains in many materials remain stable even with a ±20 percent variation in the bias field. Materials suitable for bubbles include orthoferrites having a chemical formula $RFeO_3$, where R represents yttrium or rare earthy such as samarium terbium orthoferrite. Another ferrite, $PbFe_{12}O_{19}$ produces small bubbles with domain size approximately 1 micron in diameter suitable for greater packing densities. A third type includes synthetic garnets according to the general formula $A_3Fe_5O_{12}$ (where A can be yttrium or any of one or more rare earths) having bubble diameters of approximately 3 microns.

The presence or absence of bubble domains is indicative of a binary 1 or binary 0. Therefore, domain movement corresponds to transfer of information, and useful devices such as memories and displays can be made.

When an alternating field at the same frequency $2\pi f_o$, as the precessional frequency, $\omega_o$, is applied to the precessing magnetic moments, an energy absorption from the alternating field occurs. This is due to the alternating field applying a torque to the rotating vector, $\vec{\mu}$, thereby imparting energy to the precessing moments associated with the alternating magnetic field, $f_o$, of the precessing magnetic moments. Furthermore, applied alternating fields not having the resonant frequency are not absorbed by the film. If an alternating field is varied in frequency about the precessional frequency corresponding to the local field, an energy absorption from the alternating field will occur only at the precessional frequency. Since a change in magnetization by a bubble domain passing a point is reflected by a change in magnetic field in the vicinity of the loop or pick-up coil of a resonance sensor at that point, the application of an alternating r.f. field parallel to the plane of the film would fulfill all the conditions required for resonance detection.

Referring now to FIG. 1, there is shown a technique for detection of bubble domains employing the aforementioned resonance concept utilizing two alternate types of pickup coils. A thin magnetic film 10, capable of sustaining bubble domain proparation is shown having magnetic bubble domains 12, 14. Film 10 is deposited on substrate 28, with an insulating layer (not shown) on top of the film. Another layer contains the various Permalloy T-bars (not shown) or other shapes for the desired paths and functions for bubble domains is placed above the insulating material. On top of the Permalloy, pick up coils 20 and 22 or loops of conductive nonmagnetic material are deposited. Two alternating fields are supplied, one alternating field 16 parallel to the plane of the film 10, with another alternating field 18 skewed to the plane. The directions for these alternating fields 16 and 18 correspond to a pick up coil 22 whose axis is in the plane of the film 10 and another coil 20 whose axis is perpendicular to the film, respectively.

One method of bubble resonance sensing is accomplished by providing a homogeneous alternating field parallel to thin film 10 and perpendicular to $H_{bias}$ 24. If the bias field 24 and the deposited Permalloy T-bar channels provide sufficient field homogeneity, the frequency of the alternating magnetic field will be tuned to the resonance frequency of a free electron (2.80246 MHz/Gauss). Depending on the bias field 24 required for the bubble material used, the frequency will be fixed. It is desirable to obtain resonance absorption only when a bubble is present, and not in its absence.

The tuned coils 20, 22 detect a change due to the power absorbed in the bubble. A detector 26 attached to the coils 20, 22 converts the change in Q of the coil to a detectable d.c. voltage level change (which may be a high frequency a.c. signal when bubble movement is extremely rapid). A field monitor such as a NMR magnetometer (not shown) may be required to control a voltage controlled oscillator to lock in on the alternating field frequency to the resonance condition in order to compensate for the system variations in bias field and temperature.

Figure 2:
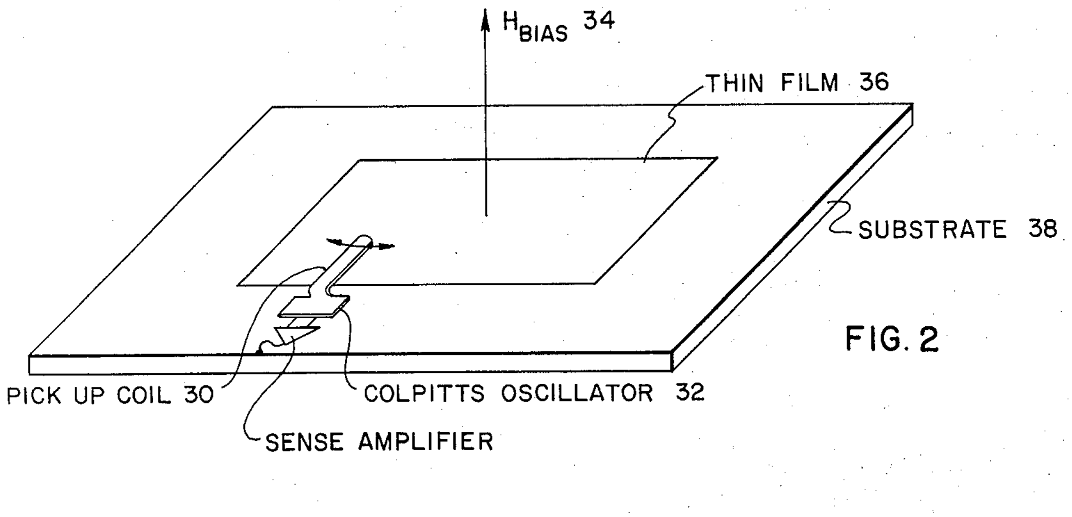

Another method of bubble resonance sensing is illustrated in FIG. 2 incorporating an active circuit in the form of a marginal oscillator or Pound box. Pick up coil 30 forms part of a Colpitts oscillator 32 and essentially serves as a Q multiplier. Each resonance sensing circuit oscillates at the resonance frequency $f_o$ corresponding to the field produced by a bubble domain passing inside the pickup coil 30. If each sensing circuit oscillates at the same frequency, and the bias field $H_{bias}$ 34 is homogenous over the thin film 36 on substrate 38, resonance will occur only when the bubble passes inside the pick-up coil 30. At resonance, the oscillator circuits output is a minimum or is detuned due to a decrease in Q caused by resonance power absorption in the bubble material or its presence near the center of the pick-up coil 30. In this technique, an alternating field does not have to be applied since the alternating field is developed by the marginal oscillator's circuitry.

Figure 3:
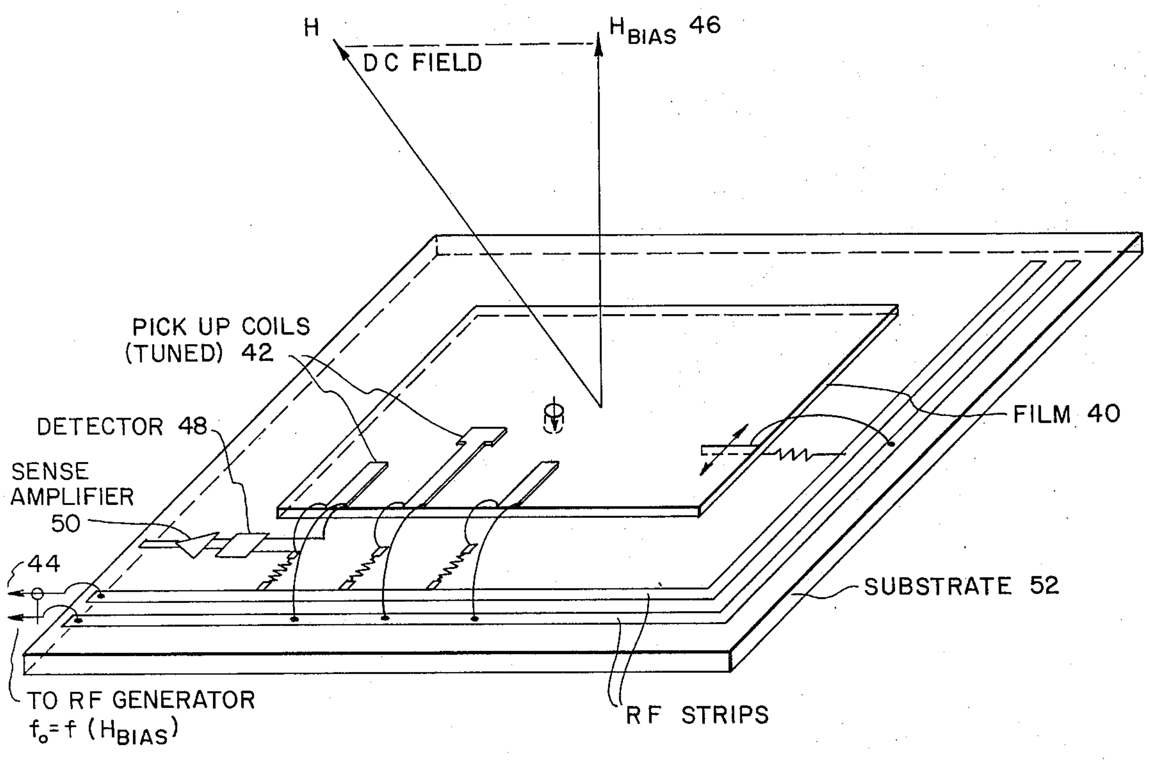

Another version applying the direct resonance technique is shown in FIG. 3. Instead of applying the alternating field about the entire film 40, the pick-up coils 42 can be driven or supplied with a constant source of alternating current 44 which supplies energy at a frequency determined by the bias field 46. When resonance occurs, a decrease in Q will be observed from the pick-up coils 42 which is detected by detector 48 and amplified in amplifier 50, both deposited on the substrate 52 of the magnetic thin film 40.

There has therefore been described an improved bubble domain sensor having a greatly improved signal to noise ratio as compared to previous sensors. By depositing the resonance detection circuitry and sense amplifiers on the adjacent substrate, a cost saving can also be realized. All or part of the resonance sensor could be made part of the magnetic thin film. A resonance pick-up coil may be positioned in various ways, for example whose axis is parallel to and containing the film. As with electromagnetic induction, the Hall effect, direct optical and magnetoresistance sensing techniques, the resonance sensing method is nondestructive.

Obviously, many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A magnetic device having cylindrical magnetic domains, comprising:

a magnetic medium in which said domains are propagated;

an alternating field applied parallel to said medium;

sensing means for detecting the presence or absence of said domains in the vicinity of said sensing means, including conductive means for sensing a change in the absorption in said medium of said alternating field.

2. A magnetic device as recited in claim 1 wherein:

said alternating field is a radio frequency field resonantly absorbed by said cylindrical domains, and wherein said conductive means comprises a pickup coil.

3. A magnetic device as recited in claim 2 wherein said coils are driven by an a.c. source whereby said coil develops said alternating field.

4. A magnetic device as recited in claim 3 wherein said coil forms part of a marginal oscillator.

5. A magnetic device as recited in claim 4 wherein:

said medium possesses uniaxial anisotropy perpendicular to its plane and wherein said cylindrical domains comprise bubble domains.

6. A magnetic device as recited in claim 5 wherein the frequency of said radio frequency is the same as the precessional frequency of the precessing magnetic moments.

7. In a magnetic bubble device containing bubble domains, means for detecting said domains comprising:

means for applying an r.f. field resonantly absorbed by said bubble domains in the vicinity of said magnetic device, and a pick up coil for sensing a change in the absorption of said field in said device.

* * * * *